US012608758B2

(12) United States Patent
Zhang

(10) Patent No.: US 12,608,758 B2
(45) Date of Patent: Apr. 21, 2026

(54) MAINTAINING ORIGINAL COLOR WHEN APPLYING SUPER RESOLUTION TO INDIVIDUAL BANDS

(71) Applicant: BAE Systems Information and Electronic Systems Integration Inc., Nashua, NH (US)

(72) Inventor: Bingcai Zhang, San Diego, CA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 438 days.

(21) Appl. No.: 18/149,416

(22) Filed: Jan. 3, 2023

(65) Prior Publication Data

US 2024/0221113 A1 Jul. 4, 2024

(51) Int. Cl.
*G06T 3/4053* (2024.01)
*G06T 3/4046* (2024.01)

(52) U.S. Cl.
CPC .......... *G06T 3/4053* (2013.01); *G06T 3/4046* (2013.01); *G06T 2207/10032* (2013.01); *G06T 2207/10036* (2013.01)

(58) Field of Classification Search
CPC ................. G06T 3/4053; G06T 3/4046; G06T 2207/20221; G06T 5/50
See application file for complete search history.

(56) References Cited

U.S. PATENT DOCUMENTS

| | | | |
|---|---|---|---|
| 2005/0147322 A1* | 7/2005 | Saed | .......................... G06T 5/90 |
| | | | 382/284 |
| 2012/0300064 A1 | 11/2012 | Mann et al. | |
| 2014/0072242 A1* | 3/2014 | Wei | ........................ H04N 19/14 |
| | | | 382/299 |

(Continued)

FOREIGN PATENT DOCUMENTS

CN 114266957 A * 4/2022

OTHER PUBLICATIONS

N. Brodu, "Super-Resolving Multiresolution Images With Band-Independent Geometry of Multispectral Pixels," in IEEE Transactions on Geoscience and Remote Sensing, vol. 55, No. 8, pp. 4610-4617, Aug. 2017, doi: 10.1109/TGRS.2017.2694881. (Year: 2017).*

(Continued)

*Primary Examiner* — Emily C Terrell
*Assistant Examiner* — Julia Z. Yao
(74) *Attorney, Agent, or Firm* — Sand, Sebolt & Wernow LPA; Gary McFaline

(57) ABSTRACT

System and methods for generating super resolution images from geospatial images having any number of bands. A super resolution model, which uses deep convolution neural networks (DCNNs), is trained using individual image bands, a large crop size or tile size of 512×512 pixels, and a de-noise algorithm. Applying one or more algorithms to maintain the original color of the image bands improves the quality metrics of the super resolution images as measured (Continued)

by PSNR (peak signal-to-noise ratio) and SSIM (structural similarity index measure) of super resolution images. Further applying one or more algorithms to remove border effects introduced during the disclosed process reduces and/or eliminates seam lines between tiles and enhances the overall accuracy of the super resolution images.

13 Claims, 5 Drawing Sheets

(56) References Cited

U.S. PATENT DOCUMENTS

| | | | | |
|---|---|---|---|---|
| 2014/0270569 | A1* | 9/2014 | Padwick | G06T 3/4038 |
| | | | | 382/274 |
| 2018/0124311 | A1* | 5/2018 | Lelescu | H04N 19/59 |
| 2019/0138849 | A1* | 5/2019 | Zhang | G06F 18/214 |
| 2019/0333199 | A1* | 10/2019 | Ozcan | G06N 3/047 |
| 2020/0280730 | A1 | 9/2020 | Wang et al. | |
| 2021/0004935 | A1* | 1/2021 | Yao | G06T 3/4084 |
| 2021/0097645 | A1 | 4/2021 | Michelini et al. | |
| 2021/0133927 | A1* | 5/2021 | Lelescu | H04N 23/951 |
| 2022/0114702 | A1* | 4/2022 | Liu | G06T 3/4053 |
| 2022/0207648 | A1* | 6/2022 | Petersson | G06T 3/4046 |
| 2022/0207680 | A1* | 6/2022 | Wang | G06N 3/045 |
| 2024/0096050 | A1* | 3/2024 | Ouyang | G06T 5/70 |
| 2024/0161233 | A1* | 5/2024 | Moon | G06T 3/4046 |
| 2024/0211540 | A1* | 6/2024 | Olsen | G06T 3/4046 |

OTHER PUBLICATIONS

Pan et al., "Structure-Color Preserving Network for Hyperspectral Image Super-Resolution," in IEEE Transactions on Geoscience and Remote Sensing, vol. 60, pp. 1-12, 2022, Art No. 5520512, doi: 10.1109/TGRS.2021.3135028 (Year: 2022).*

Zhou et al., "Hyperspectral image super-resolution: a hybrid color mapping approach," Journal of Applied Remote Sensing 10(3), 035024 (Sep. 23, 2016). https://doi.org/10.1117/1.JRS.10.035024 (Year: 2016).*

Yi et al., "Spectral Super-Resolution for Multispectral Image Based on Spectral Improvement Strategy and Spatial Preservation Strategy," in IEEE Transactions on Geoscience and Remote Sensing, vol. 57, No. 11, pp. 9010-9024, Nov. 2019, doi: 10.1109/TGRS.2019.2924096. (Year: 2019).*

Islam et al., "Position, Padding and Predictions: {A} Deeper Look at Position Information in CNNs," arXiv, in Computing Research Repository (CoRR), 2020, vol. abs/2101.12322 [online]. [retrieved on Jan. 28, 2021]. Retrieved from the Internet <URL: https://arxiv.org/abs/2101.12322> (Year: 2021).*

Jiwon Kim, Jung Kwon Lee, Kyoung Mu Lee; "Accurate Image Super-Resolution Using Very Deep Convolutional Networks," 2016 IEEE Conference on Computer Vision and Pattern Recognition (CVPR), 2016, pp. 1646-1654, doi: 10.1109/CVPR.2016.182.

International Search Report, PCT/US23/85986, mailed Apr. 10, 2024, 9 pages.

Shermeyer, J., Etten, A. V., CosmiQ Works, In-Q-Tel "The Effects of Super-Resolution on Object Detection Performance in Satellite Imagery", 2019, pp. 1432-1441, DOI: 10.1109/CVPRW.2019.00184.

Zhang, B. and R. Hammoud, 2019. Fast and accurate target detection in overhead imagery using double convolution neural networks, invited presentation, SPIE Defence + Commercial Sensing, Baltimore Convention Center, Baltimore, Maryland, 14-18 April. [https://www.spiedigitallibrary.org/conference-proceedings-of-spie/10988/1098800/Fast-and-accurate-target-detection-in-overhead-imagery-using-double/10.1117/12.2519795.full?SSO=1].

Zhang, B. 2021. Intelligent photogrammetry for digital elevation model production. SPIE Defence + Commercial Sensing, Apr. 12-16 [https://www.spie.org/Publications/Proceedings/Paper/10.1117/12.2595802?SSO=1].

Zhang, B., Y. Luu, K. Vaidyanathan, F. Paderes, R. Settergren, and K. de Venecia, 2021. Deducing 15cm detail from 30cm satellite images with Deep Learning, [https://www.scribd.com/document/588896242/GXP-TechnicalPaper-2021-11-Deducing-high-resolution-satellite-images].

DeepObject Technical Brief, [https://www.geospatialexploitationproducts.com/wp-content/uploads/2020/09/GXP_Technical-Brief-2020-08-DeepObject-final.pdf].

Zhang, B., 2016. Big geospatial data + deep learning + high performance computing = geospatial intelligence, presentation S6260, 2016 GPU Technology Conference, San Jose, CA, Apr. 4-7.

Zhang, B., 2017a. 3D DeepObject for precision 3D mapping, featured presentation S7149, 2017 GPU Technology Conference, San Jose, CA, May 8-11.

Borel-Donohue, C. and S. Susan Young, Image Quality and Super Resolution Effects on Object Recognition Using Deep Neural Networks.

Ferdous, S. Nyma, M. Mostofa, N. M. Nasarabadi, Super Resolution-Assisted Deep Aerial Vehicle Detection.

* cited by examiner

MAINTAINING ORIGINAL COLOR WHEN APPLYING SUPER RESOLUTION TO INDIVIDUAL BANDS

TECHNICAL FIELD

The present disclosure is generally directed to the fields of convolution neural networks (CNN) and image super resolution. More particularly, in one example, the present disclosure relates to deep learning applied to geospatial imagery. Specifically, in another example, the present disclosure relates to methods of applying deep learning application super resolution (SR) to multispectral and hyperspectral geospatial imagery to deduce higher resolution images from lower resolution images while maintaining original color of the lower resolution pixels.

BACKGROUND

Geospatial images are images of the earth's surface that are obtained using airborne or space borne imaging systems, including, for example, aircraft or satellites. These images are useful for a number of reasons including studying natural and manmade environments. Monitoring melting of glaciers, erosion of river valleys, and changes in coastlines are some aspects of the natural environment that can be studied and mapped using geospatial images. Mapped cities showing roads, building, parking lots, traffic flow etc., are part of the manmade environment that can be monitored using geospatial images. These images are also useful in the creation of maps or mapping software.

Thus, satellite-based geospatial imagery plays an important role in many modern day applications, including, but not limited to, navigation, tracking, search and rescue, and scientific study. Other military-based applications may utilize satellite-based imagery for reconnaissance and intelligence collection, including such applications as tracking troop and equipment movement, and/or monitoring sensitive sites. The value of these satellite-based images is highly dependent on image quality and resolution, which can be limited by the low resolution equipment found on most geospatial imagery satellites, the large ground sample distance (GSD), or a combination of both.

Resolution of geospatial images is especially important since some of them are acquired from space platforms such as satellites, which may be hundreds miles above ground. For example, the accuracy of object detection from satellite images depends on their resolution or ground sample distance. The resolution is especially important for small objects such as vehicles, which may cover fewer than 20 pixels. It is very expensive and challenge to develop a high resolution space imaging system.

Additionally, the cost of deploying new, more advanced high-resolution sensors or imaging equipment into Earth orbit is exceedingly expensive, with costs nearing or exceeding a billion dollars per satellite launch. Similarly, it is practically impossible and is further cost prohibitive to upgrade physical hardware of existing geospatial imaging satellites as the launch of a manned crew is expensive, time consuming, and dangerous; and the alternative, namely the launch of robotic system operable to upgrade existing satellite hardware, far exceeds the cost of launching and deploying a new high-resolution sensor.

Additional challenges for super resolution geospatial images, especially satellite images, is that they may have more than three wavelength bands (e.g. color—such as red, green, and blue (RGB)). Typically, the current processes limit the images to RGB coloration. While many applications that use geospatial images can benefit from more than three band images; however, there are no known algorithms that can super resolution an image from more than three band space effectively.

Current back-end processing algorithms to improve the resolution of images tend to operate by combining multiple color bands into a single band before applying the algorithmic resolution processes. While this can allow backend processing to somewhat improve resolution of geospatial imagery, it does so at the expense of accuracy in the color bands of the image. Inaccurate color bands can cause later errors to be introduced in image analysis as false color bands and/or false color resolution may cause misidentification of objects and/or targets, or may prevent the recognition of a target present in the image entirely. In other words, the effect of applying super resolution algorithms to a combined color band consisting of merged multiple individual color bands can increase later false positive results, reduced recall, and reduced precision. False positives can occur when something is identified as present the image that is not actually present in real life (true positives). Recall is measured as the ratio of true positives to the total number of detected objects and is thus reduced by false positives. Similarly, precision is measured as the ratio of true positives to total positives (i.e. the sum of true and false positives) which is again reduced by an increased number of false positive results.

Accordingly, the tradeoff for current systems applying super resolution algorithms to combined color bands is an increased resolution in the geospatial image that is less precise and accurate, and more likely to generate false positives, than is desirable.

Current super-resolution algorithms do not perform accurately when the images are noisy such as in satellite images. Image noise may negatively impact training and therefore images should be de-noised before they are used for training. Training is the process of learning from data.

SUMMARY

The present disclosure addresses these and other issues by providing a system and method for maintaining original color when applying super resolution to individual bands while minimizing changes to super resolution pixel values. Changes to super resolution pixel values are independent from each other when applying super resolution to individual bands. As a result, these changes may result in changes to its color. To maintain the original color, super resolution pixel values are modified. There are almost infinite number of combinations to modify super resolution pixel values to maintain the original color. The present disclosure minimizes modifications to the super resolution pixel values while maintaining the original color, and generates super resolution images with higher accuracy.

The present disclosure addresses noisy image issue by providing a de-noise method. For noisy pixel values, their differences between ground-truth pixel values and derived pixel values are large. Using their differences to de-noise them before using them as training pixels. The derived pixel values are generated by applying Gaussian blur, downsampling, and up-sampling. The present de-noise method generates higher accuracy super-resolution satellite images.

The value of satellite imagery is highly dependent on image quality and resolution and these two components can now be enhanced through advanced Artificial Intelligence/ Machine Learning (AI/ML) image processing techniques. Although algorithms used in image processing cannot create new information, deep learning, a branch of Artificial Intelligence (AI), can be used to create higher quality, higher resolution, multispectral and hyperspectral Images from lower resolution satellite images, also known as super resolution. Applying very deep convolution neural network learning in the geospatial domain, these super resolution images can support manual and automatic imagery analysis workflows. Thus, deep learning is particularly useful for analyzing geospatial images.

In one aspect, an exemplary embodiment of the present disclosure may provide a method of training a super resolution model comprising: feeding a plurality of training images into a deep convolutional neural network (DCNN) processor; identifying at least one pixel having a noisy pixel value; scaling the at least one noisy pixel to minimize any difference between the noisy pixel and an associated ground-truth pixel value; inputting a low resolution test image into the super resolution model; selecting a plurality of pixels from the low resolution test image that are adjacent to a plurality of super resolution pixels deduced from the DCNN; identifying an original pixel from a training image having a minimum pixel value difference from each super resolution pixel; and generating a super resolution test image of each of the plurality of original training images using the plurality of super resolution pixels. This exemplary embodiment or another exemplary embodiment may further provide wherein the plurality of pixels from the low resolution test image further comprise one of: a group of nine pixels adjacent to the plurality of super resolution pixels deduced from the low resolution test image, and a group of four pixels adjacent to each individual super resolution pixel deduced from the low resolution test image. This exemplary embodiment or another exemplary embodiment may further provide adding the super resolution test image into a new group of training images when a quality metric of the super resolution test image is below a predetermined threshold. This exemplary embodiment or another exemplary embodiment may further provide re-training the super resolution model with the new group of training images containing each super resolution test image with quality metrics below the predetermined threshold. This exemplary embodiment or another exemplary embodiment may further provide wherein the quality metrics computed further comprise: at least one of peak signal-to-noise ratio (PSNR) and structural similarity index measure (SSIM).

In another aspect, an exemplary embodiment of the present disclosure may provide a computer program product including least one non-transitory computer readable storage medium in operative communication with a processor and a framework comprising an active data storage and an execution protocol, wherein the execution protocol is coupled with the active data storage, the storage medium having instructions stored thereon that, when executed by the processor, implement a method of generating a super resolution geospatial image from a lower resolution image comprising: generate a super resolution individual image tile from the low resolution image utilizing a trained super resolution model; select a plurality of pixels from the low resolution image that are adjacent to a plurality of super resolution pixels deduced from the super resolution model; identify an original pixel from the lower resolution image having a minimum pixel value difference from each super resolution pixel; maintain the original color of the at least one lower resolution image in the super resolution image tile by selecting a reduced output area from the image tile; remove any border effects introduced from the reduced output area selection; and generate a super resolution geospatial image having a higher resolution than the low resolution image. This exemplary embodiment or another exemplary embodiment may further provide wherein the plurality of pixels from the low resolution image further comprise one of: a group of nine pixels adjacent to the plurality of super resolution pixels deduced from the low resolution image, and a group of four pixels adjacent to each individual super resolution pixel deduced from the low resolution image. This exemplary embodiment or another exemplary embodiment may further provide wherein the super resolution individual image tile has a crop size of 512×512 pixels. This exemplary embodiment or another exemplary embodiment may further provide wherein the reduced output area of the super resolution individual image tile is the middle 492×492 pixels of the super resolution individual image tile. This exemplary embodiment or another exemplary embodiment may further provide wherein the instructions further comprise: find the corresponding original pixel for each super resolution pixel to improve at least one quality metric of the super resolution geospatial image. This exemplary embodiment or another exemplary embodiment may further provide wherein the quality metrics computed further comprise: at least one of peak signal-to-noise ratio (PSNR) and structural similarity index measure (SSIM). This exemplary embodiment or another exemplary embodiment may further provide wherein maintaining original color of the lower resolution image further comprises: modify each super resolution pixel value to match color components of an original pixel corresponding to the super resolution pixel. This exemplary embodiment or another exemplary embodiment may further provide wherein modifying each super resolution pixel to match the color components of the original pixel further comprises: compute color components by the ratios between individual band pixel value and the sum of all band pixel values. This exemplary embodiment or another exemplary embodiment may further provide wherein the instructions further comprise: sequentially search a range of discrete values centered at each super resolution pixel to find minimum differences between super resolution pixel values and modified super resolution pixel values.

In yet another aspect, an exemplary embodiment of the present disclosure may provide a system comprising: at least one of a camera and a sensor operable to capture a geospatial image of a surface; at least one processor capable of executing logical functions in communication with the vehicle and the at least one of the camera and the sensor; and at least one non-transitory computer readable storage medium having instructions encoded thereon that, when executed by the processor, implements operations to enhance the resolution of the geospatial image, the instructions including: receive the geospatial image as a low resolution image; input the low resolution image into a previously trained super resolution model; generate a super resolution individual image tile from the low resolution image utilizing the trained super resolution model; select a plurality of pixels from the low resolution image that are adjacent to a plurality of super resolution pixels deduced from the super resolution model; identify an original pixel from the lower resolution image having a minimum pixel value difference from each super resolution pixel; maintain the original color of the at least one lower resolution image in the super resolution image tile by selecting a reduced output area from the image tile; remove any border effects introduced from the reduced output area selection; and generate a super resolution geospatial image having a higher resolution than the low resolution image. This exemplary embodiment or another exemplary embodiment may further provide wherein the plurality of pixels from the low resolution image further comprise one of: a group of nine pixels adjacent to the plurality of super resolution pixels deduced from the low resolution test image, and a group of four pixels adjacent to each individual super resolution pixel deduced from the low resolution test image. This exemplary embodiment or another exemplary embodiment may further provide wherein the super resolution individual image tile has a crop size of 512×512 pixels and the reduced output area of the super resolution individual image tile is the middle 492×492 pixels of the super resolution individual image tile. This exemplary embodiment or another exemplary embodiment may further provide wherein the instructions further comprise: find the corresponding original pixel for each super resolution pixel to improve at least one of peak signal-to-noise ratio (PSNR) and structural similarity index measure (SSIM) of the super resolution geospatial image. This exemplary embodiment or another exemplary embodiment may further provide wherein the instructions further comprise: modify each super resolution pixel value to match color components of an original pixel corresponding to the super resolution pixel by computing color components by the ratios between individual band pixel value and the sum of all band pixel values to maintain the original color of the lower resolution image. This exemplary embodiment or another exemplary embodiment may further provide wherein the instructions further comprise: find minimum differences between super resolution pixel values and modified super resolution pixel values by sequentially searching a range of discrete values centered at each super resolution pixel.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

Similar numbers refer to similar parts throughout the drawings.

DETAILED DESCRIPTION

The present disclosure relates to a system and method for generating super resolution multispectral and hyperspectral satellite images. Multispectral satellite images tend to have 3 to 10 color wavelength bands while hyperspectral satellite images tend to have a few hundred narrow bands. Both multispectral and hyperspectral images are typically low resolution, therefore, applying a super resolution algorithm to the images is particularly useful.

As discussed herein, super resolution algorithms (referred to herein as super resolution) can be applied to individual bands of multispectral and hyperspectral satellite image to overcome the limitations of Y luminance, Cb blue difference, and Cr red difference (YCbCr) space, which is for typically used for three bands only. Additionally, while super resolution is to improve image resolutions, not to change image colors, maintaining the original color of the multispectral and hyperspectral images when applying super resolution to individual bands can improve quality metrics.

Figure 1:
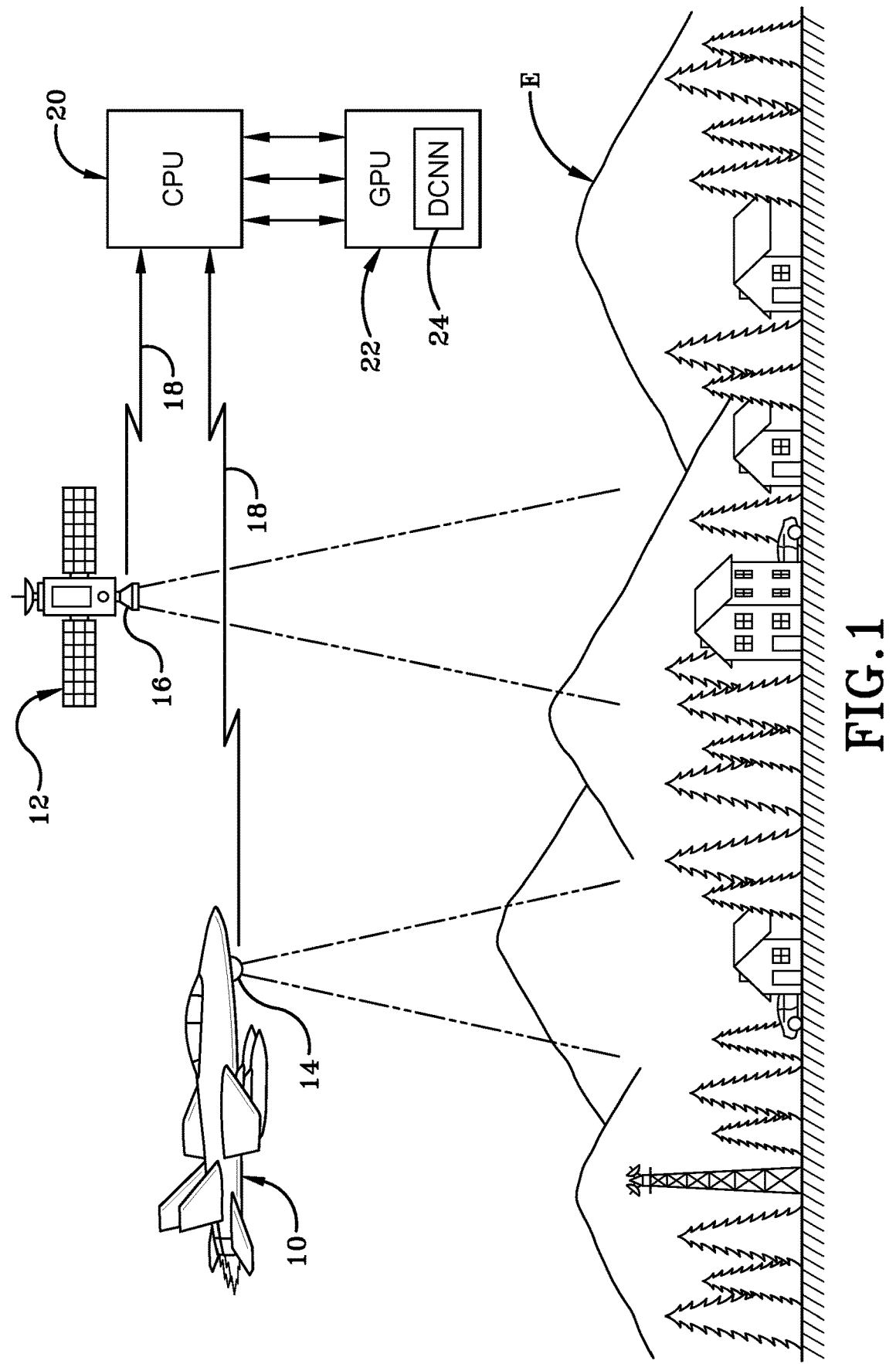
FIG. 1 (FIG. 1) is a diagrammatic illustration of the system for detecting objects of interest in geospatial images, according to one aspect of the present disclosure.

With reference to FIG. 1, the Earth "E" is shown with a vehicle, such as an airplane 10 or a satellite 12, moving at a distance above the surface of the Earth "E". The airplane 10 or satellite 12 may be equipped with one or more cameras 14 or sensors 16 for capturing images of regions of the Earth's surface as the airplane 10 or satellite 12 travels above the Earth "E". The camera(s) 14 and sensor(s) 16 are shown in FIG. 1 as a camera 14 on airplane 10 and a sensor 16 on satellite 12; however, it will be understood that camera(s) 14 and/or sensor(s) 16 may be interchangeable and may be used with any suitable vehicle or platform, as desired or as dictated by the desired implementation. The term "geospatial images" as used herein will be understood to include multispectral and hyperspectral images that are captured by any type of vehicle, camera, sensor, or the like located at any suitable distance above the surface of the Earth "E".

When one or more geospatial images are captured by the camera(s) 14 and/or sensor(s) 16, those geospatial images may be wireless uploaded as input data (shown as signal lines at reference 18 and referred to as image data 18 herein) into a database stored on one or more central processing units (CPU) 20. CPU 20 may be any suitable processing unit, including, but not limited to, a processor or series of processors, or one or more logics, logic controllers, or the like. CPU 20 may include or may otherwise be in communication with at least one non-transitory storage media devices and may be further operable to carry out a set of instructions encoded on the one or more non-transitory storage media devices, including instructions to process and apply super resolution to one or more images from the image data 18, as discussed further herein.

CPU 20 may be linked to or otherwise in communication with one or more graphics processing units (GPU) 22, which may be any suitable GPU 22 operable to receive, store, and/or display image data 18 as one or more geospatial images, as discussed herein. GPU 22 may further include a very deep super resolution convolution neural network (DCNN) 24 (also referred to herein as deep CNN 24 or simply CNN 24). CPU 20 and GPU 22 (including the one or more non-transitory storage media devices) may be pre-programmed with a plurality of algorithms (to be described later herein) that are designed to carry out, operate, or otherwise perform one or more super resolution algorithms to the image data 18 to enhance the resolution of multispectral and hyperspectral images captured by camera(s) 14 and/or sensor(s) 16.

The processes described herein may be best understood through a discussion of the application and advantages thereof. In particular, the implementation of the processes described herein may be accomplished via any suitable system utilizing suitable camera/sensor equipment in connection with a suitable processor or processing system, including legacy systems. Specifically, the processes described herein are representative of improved processing of geospatial images taken by one or more legacy systems and these processes may be implemented without significantly increasing size, weight, power, or cost to existing legacy systems. Thus, the innovation in the processing and handling of geospatial imagery of the present disclosure is necessarily rooted in improvement upon existing computer technology and processing of geospatial imagery and arise in the realm of computer image processing, more particularly, in the realm of processing geospatial imagery to improve the resolution and accuracy of the images. It will be further understood that the improvement to existing technological-based functionality lies not in the implementation utilizing specific hardware but instead in the improvements relating to the functionality and enhanced performance of carrying out the processes described herein.

Accordingly, very deep CNN, such as CNN 24, used in artificial intelligence/machine learning (AI/ML) workflows can learn transformations between different zoom levels of image pyramids, also referred to as resolution sets (RSets). The CNN can learn the transformation from a 2:1 RSet at a ground sample distance (GSD) of 60 cm to the full resolution image at a GSD of 30 cm by minimizing the differences between ground-truth full resolution and derived 2× zoom. As used herein, ground-truth pixels are the pixels from the original image or from the raw image. When the super-resolution model is trained, as discussed herein, the original image pixels are used as ground-truth pixels. In other words, the trained super-resolution model is to change the processed pixel values to match the original image pixel values. Therefore, the original image pixel values are treated as the ground-truth pixel values. After training, the learned transformation may be applied to a 1:1 RSet of full resolution images, transforming the pixels to 2× resolution. The learned transformation, i.e., a CNN super resolution model, has intelligence built in and can infer higher resolution images.

Training the CNN 24 involves feeding vast numbers of diverse training images into the CPU 20. The images may cover vast varieties of corners, lines, curves, edges, shadows of houses, buildings, streets, bridges, trees, vehicles, planes, vessels, etc. For example, transformations between RSet 2:1 to RSet 1:1 for a thin line (one or two pixels) are different from for a thick line (more than 2 pixels). Training and generating super resolution images are iterative processes. When a super resolution image is of poor accuracy, this image is added to the training image set to re-train the model such that the trained model can generate high accuracy super resolution image.

The CNN super resolution model must have enough model capacity for a vast number of transformations from RSet 2:1 to RSet 1:1. Training a CNN super resolution model is resource intensive and can easily take days and weeks depending on computer hardware. The selection of training images is the key to reduce training time by eliminating redundant training images. For example, an image with billions of pixels covering a large city should not be used entirely for training. Instead, a small subset of this large image should be used for training.

During training of the CNN super resolution model, individual image bands are used as training image chips. During a generation phase, discussed below, the super resolution model may be applied to individual image bands sequentially. The final super resolution image is generated by maintaining original color while minimizing modifications to the super resolution pixel values.

For three band images, the images can be transformed from RGB space to YCbCr space and super resolution algorithms may be applied only to the Y band. As mentioned above, RGB bands are not efficient as a representation for storage and transmission since they have a lot of redundancy and there are no known math equations that can transform from more than three band space into a space similar to YCbCr space.

The present disclosure relates to a system and method to improve the resolution of multispectral and hyperspectral satellite images utilizing super resolution algorithms on satellite images with three or more bands. The disclosed super resolution algorithms may allow the system to maintain the original colors of the images when applying super resolution to individual bands, resulting in higher accuracy. For example, for a super resolution image of 322,961,408 pixels, the quality metrics PSNR (peak signal-to-noise ratio) and SSIM (structural similarity index measure) may be improved from approximately 33.4067 (PSNR) and 0.948264 (SSIM) to approximately 35.4385 and 0.956724, respectively, after applying the super resolution algorithm for maintaining original color, discussed below.

According to one aspect, pixel color may be defined by its component ratios. For example, the component ratios of an eight band pixel (243, 331, 339, 177, 129, 327, 811, 524) are (243/2881, 331/2881, 339/2881, 177/2881, 129/2881, 327/2881, 811/2881, 524/2881) or (8.43%, 11.49%, 11.77%, 6.14%, 4.48%, 11.35%, 28.15%, 18.19%).

Changes to super resolution pixel values are independent from each other when applying super resolution algorithms to individual bands. As a result, these changes may result in changes to the color of the particular band. To maintain the original color, super resolution pixel values may be modified. There are almost infinite number of combinations to modify super resolution pixel values to maintain the original color. The super resolution algorithms of the present disclosure minimize modifications to the super resolution pixel values while maintaining the original color and generating super resolution images with higher accuracy.

The super resolution algorithms of the present disclosure may further serve to locate the original pixel for each super resolution pixel. As discussed herein, the original pixel may be one of nine adjacent pixels or one of four adjacent pixels in the original image. The original pixel has the minimum pixel value difference from the super resolution pixel.

According to another aspect, the present system and methods may provide iterative training that may eliminate redundant training image chips and reduce training time. In this iterative training, discussed further below, a large training image may be split into tiles, such as a tile containing 512×512 pixels. Initially, a small number of tiles may be used for training. After training, test image tiles may then be used to generate super resolution images. For each test image tile, its quality metrics, e.g. PSNR and SSIM may be computed. If the quality metrics of the test image tiles are of poor accuracy, then the test image tile may be added to the set of training image tiles for future training of the CNN model. If the quality metrics of the test image tiles are of high accuracy, then that test image tile is not added to the set of training image tiles. When there are enough additional training image tiles added back into the set, a new iteration of training begins. During this iterative training process, new images may be split into new test image tiles and used to generate super resolution images. As before, if their quality metrics are of poor accuracy, then they are added into a new set of training image tiles and used in the next iteration of training. For purposes of this disclosure, an image may be considered "low accuracy" if the quality metrics fall below a predetermined threshold.

The process of generating super resolution images, discussed below, includes removing border effects between tiles. The super resolution CNN model generates super resolution image one tile a time using a tile size of 512×512 pixels. This tends to cause the accuracy at the borders of this 512×512 tile to be not as good as the accuracy closer to the middle of the tile. To counteract these border effects, a super resolution algorithm uses only the middle area of a tile as the final super resolution image by generating tiles that overlap. According to one aspect, these images may overlap by approximately 10 pixels. Thus, for a tile of 512×512 pixels, only the middle 492×492 pixels are used in the final super resolution image.

According to another aspect, the presently disclosed system may significantly improve AI/ML object detection accuracy from super resolution geospatial images. This system may significantly improve manual feature extraction accuracy by allowing image analysts to place the extraction cursor at the precise edges and corners of manmade objects, which may benefit all imagery analysis workflows and derived products which use satellite images. The present system may further comprise a large crop size of 512 pixels for both training and super resolution generation.

Having thus described the system and methods generally, the specific algorithms and processes will now be discussed.

Resolving higher quality pixels from lower resolution pixels becomes feasible with deep learning. "Image processing cannot create new information" is a long-held truth in remote sensing and photogrammetry. Deep learning CNN can learn the transformations from lower resolution images to a higher resolution image for millions of different cases, and then these learned transformations can be used to deduce even higher resolution images.

The following explanation uses a simple example to illustrate how higher resolution pixels can be deduced from lower resolution pixels.

Figure 2A:
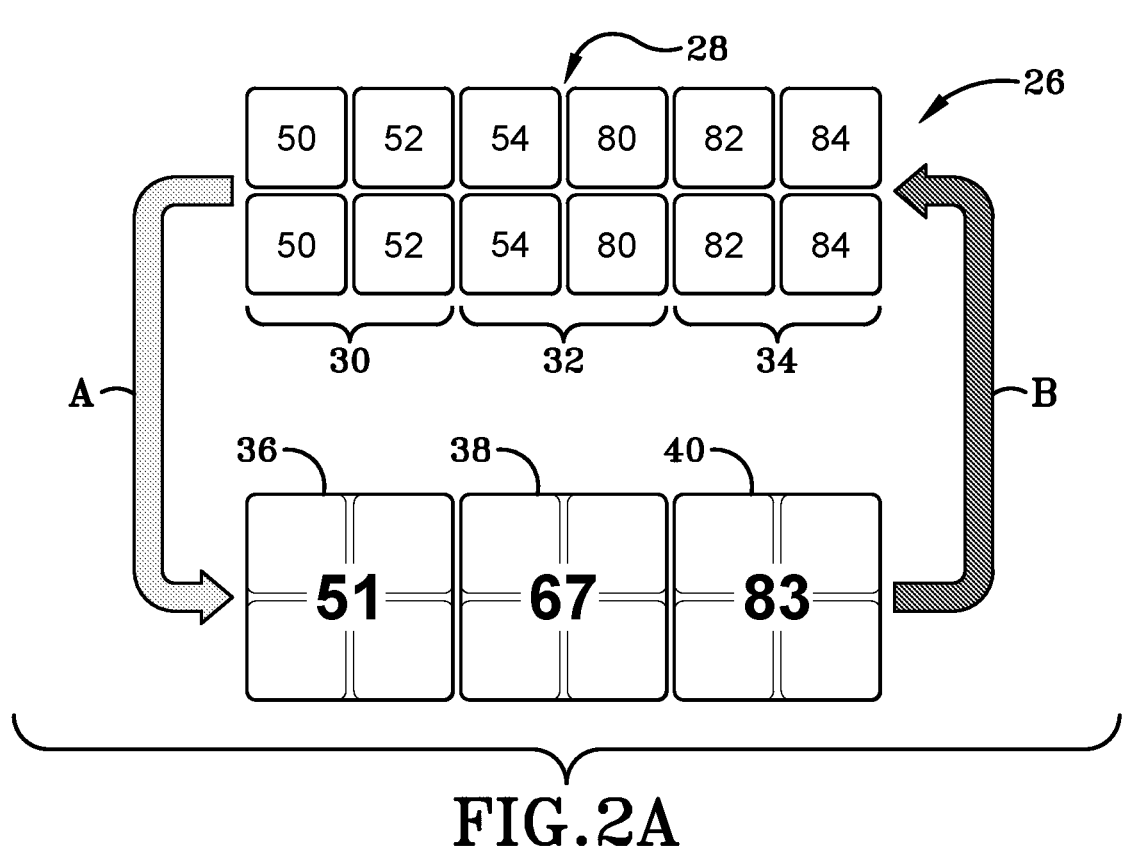
FIG. 2A (FIG. 2A) shows a first step in a method of deducing higher resolution pixels from lower resolution pixels, according to one aspect of the present disclosure.

With reference to FIG. 2A, there are twelve pixels (the individual boxes indicated at reference 26) having a GSD of 30 cm representing a 1:1 RSet. These twelve pixels 26 represent a vertical step edge 28 in the middle (with pixel intensity values stepping up from 54 to 80 according to this example). The twelve pixels 26 may be grouped into three sets of four, shown at 30, 32, and 34. Averaging (shown at arrow A) each group of four pixels 30, 32, and 34 into single pixels 36, 38, and 40, respectively, we get three single pixels 36, 38, and 40 with a GSD of 60 cm (representing the 2:1 RSet).

Given these three pixels of GSD 60 cm, the test is to deduce the original twelve pixel 26 intensities with the GSD of 30 cm (shown at arrow B). While there is no single definitive solution, it is found that the present system and processes can reliably interpret twelve pixels of GSD 30 cm from three pixels of GSD 60 cm. For this example, pixels 26 with values 54 (p54) and 80 (p80) may be used, with the 54 and 80 intensity values referring to the unknown values of the original 30 cm pixels. The three pixels 36, 38, and 40 of GSD 60 cm may be further denoted as p51 (pixel 36), p67 (pixel 38), and p83 (pixel 40). The names 'p54' and 'p80' represent the ground-truth values of the pixels 26 that are attempting to be recovered.

Figure 2B:
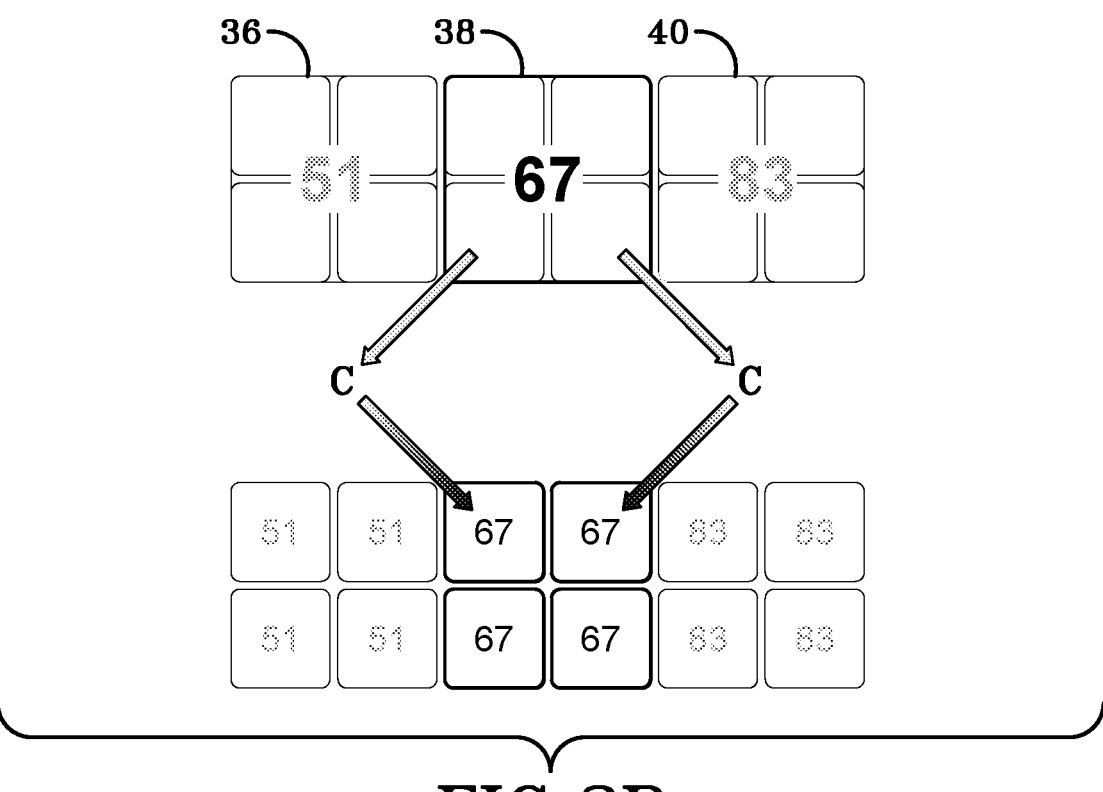
FIG. 2B (FIG. 2B) shows a second step in a method of deducing higher resolution pixels from lower resolution pixels, according to one aspect of the present disclosure.

With reference to FIG. 2B the three pixels 36, 38, 40 of GSD 60 cm may be divided into four pixels each (shown at arrows C), with intensity values matching the value of the GSD 60 cm pixels 36, 38, 40. As seen in FIG. 2B, the middle pixel 38 is emphasized for clarity but the first and third pixels 36 and 40 are utilized in this example as well. P54 and P80 are therefore computed as:

$$p54 = w1 * p51 + w2 * p67 + w3 * p83$$

where w1, w2, and w3 are the weights for p51, p67, and p83 respectively; and;

$$p80 = f1 * p51 + f2 * p67 + f3 * p83$$

where f1, f2, and f3 are the weights for p51, p67, and p83 respectively.

It should be noted that the weights for the same p51, p67, and p83 are different for p54 and p80. In the first iteration of CNN training, w1 and f1 are initialized to 0.0, w2 and f2 are initialized to 1.0, and w3 and f3 are initialized to 0.0. Thus, p54=67=p80. The loss (the ground-truth value minus the inferred value) in both cases is +/−13.

Initially, w1 and f1 may be assigned to 0.0, w2 and f2 to 1.0, and w3 and f3 to 0.0. The deduced value p54 is 67 and p80 is then 67. The losses are −13 and +13 respectively. In the next number of iterations, w1, f1, w2, f2, w3, and f3 may be adjusted such that the losses approach 0.0. The algorithms to adjust w1, f1, w2, f2, w3, and f3 based on losses are called gradient decent, which are the standard CNN algorithms.

Figure 2C:
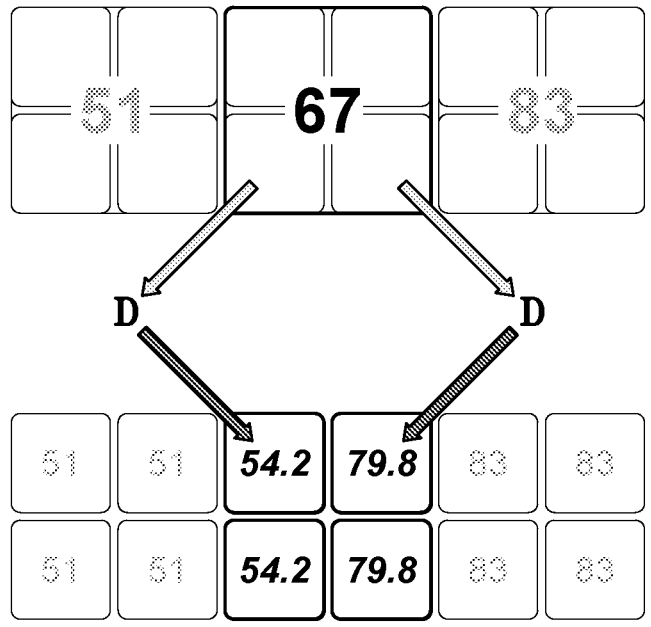
FIG. 2C (FIG. 2C) shows a third step in a method of deducing higher resolution pixels from lower resolution pixels, according to one aspect of the present disclosure.

With reference to FIG. 2C, the values of w1, f1, w2, f2, w3, and f3 may be iteratively updated using gradient decent to minimize the losses (shown at arrows D). The losses may never converge to zero, which means the system may never deduce a perfect, or zero-loss, higher resolution image, but CNN will enable the system to achieve a good, or low-loss, recovery of the original image. The more training images used, the closer the system will get to perfectly recovering the original higher-resolution image.

Geospatial satellite images are usually noisy and the inclusion of noisy pixels contributes to a degraded super-resolution model. One of the main factors that introduce noise into the images is the distance between the camera and the ground object (Earth surface). For satellite images, the camera is a few hundred miles above the ground object and the light travels through a few hundred miles of atmosphere, which introduces significant noise. Significant noises are a major issue for super-resolution because the super-resolution model is to minimize the differences between the ground-truth pixel or original pixel values and the processed pixel values, as described herein. Thus, when training the super resolution model, the differences between ground-truth pixel values and derived pixel values need to be minimized. The derived pixel values are computed by applying Gaussian blur, down-sampling, and up-sampling to the ground-truth pixel values. As a result, the derived pixel values have their noises partially smoothed out. When a ground-truth pixel has noisy values, the differences between the ground-truth pixel values and derived pixel values are large. To reduce the effects of noise pixel values, a de-noise algorithm, presented below, may be used during the training process. These algorithms discussed below may operate to smooth the original image and reduce the image noises. As a result, the ground-truth pixel has significant noises while the processed pixel has less noise. When minimizing the differences between them, the model is learning the noises or negatively impacted by the noises, not the transformations between different resolutions or super resolution. The processes described herein may therefore operate to reduce the noise in the ground-truth images.

---

DE-NOISE ALGORITHM

Require: g_p, ground truth pixel.
Require: d_p, derived pixel.
Require: s_g_p, scaled ground truth pixel used for training.
Require: s_d_p, scaled derived pixel used for training.
Require: c, scale down factor, which is the max pixel value of the ground-truth image.
Require: t, threshold value for detecting noise pixels with default value of 0.5
s_d_p = d_p / c
s_g_p = g_p / c
if ( | s_d_p − s_g_p | > t ) ←| | is the absolute value
s_g_p = ( s_g_p + s_d_p ) / 2.0

---

The CNN model may learn the intelligence to preserve sharp vertical step image edges by minimizing the loss function. The CNN model may further learn all the transformations that occur between lower and higher resolution images, and then it can apply these learned transformations to the highest resolution imagery to deduce even higher resolution images (i.e. super-resolution). Although FIGS. 2A-2C shall be understood as simple examples, they illustrate a similar process to the much more complex CNN model described herein and below.

Original Pixel Algorithm

Figure 3:
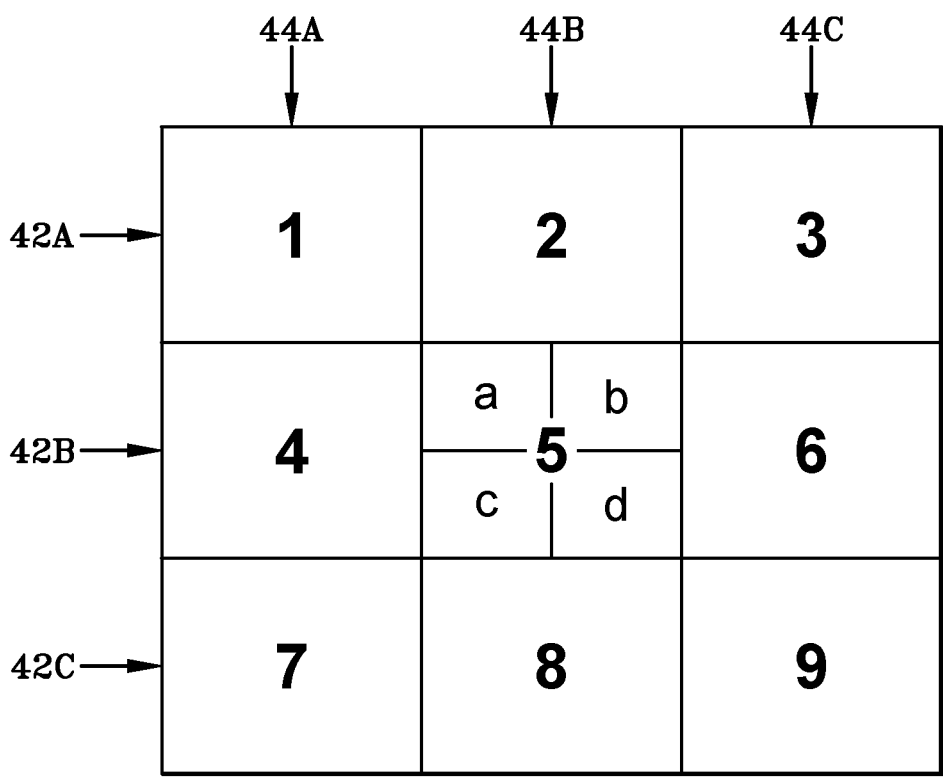
FIG. 3 (FIG. 3) is an exemplary view of a method to remove tile border effects by output the middle 492×492 pixels out of 512×512 pixels, according to one aspect of the present disclosure.

With reference to FIG. 3, a procedure that finds the corresponding original pixel for any particular super resolution image pixel will now be discussed. There are three algorithms utilized in the process of identifying the original pixel, namely: algorithm (1.1) which determines nine adjacent pixel indexes in the original image (shown in FIG. 3 as pixels 1-9 for any of pixels a-d); algorithm (1.2) which determines four adjacent pixel indexes in the original image (shown in FIG. 3 as the four pixels surrounding any of pixels a-d. For example, for pixel a, the four adjacent indexes would be pixels 1, 2, 4, and 5); and algorithm (1.3) which performs the actual search. As seen in FIG. 2, the exemplary pixel grid shown is organized in a 3×3 grid having three rows (shown as rows 42A, 42B, and 42C) and three columns (shown as columns 44A, 44B, and 44C). For pixels first two rows 42A and 42B, last two rows 42B and 42C, first two columns 44A and 44B, and last two columns 44B and 44C in the super resolution image, they are computed slightly different to deal with boundary conditions. As used herein in relation to the grid shown in FIG. 3 and discussed with the algorithms below, the term sample(s) and column(s) interchangeable and similarly, the term row(s) and line(s) will be understood as interchangeable.

---

Algorithm 1.1 Nine adjacent original pixel algorithm

FIG.3 shows an example of nine adjacent pixels (pixels 1-9) in the original image for super resolution pixels a, b, c, and d.
Require: o_i, adjacent original pixel index array with size nine. For each super resolution pixel, this index array stores nine adjacent original image pixel index.
Require: e_h, enhance level, which is 2 for 2X super resolution, and 4 for 4X super resolution.
Require: $s_y$ and $s_x$, pixel index in super resolution image s.
Require: n, number of samples of original image.
for l = 0, ... , 2 do
   y = $s_y$ / e_h + (l− 1)
   for s = 0, ..., 2 do
     x = $s_x$ / e_h + (s− 1)
     o_i$_{[l * 3 + s]}$ = y * n + x
   end for s
end for l

---

Algorithm 1.2 Four adjacent original pixel algorithm.

FIG.3 shows an example of four adjacent pixels in the original image for super resolution pixel a.
Require: o_i, adjacent original pixel index array with size four. For each super resolution pixel, this index array stores four adjacent original image pixel index.
Require: e_h, enhance level, which is 2 for 2X super resolution, and 4 for 4X super resolution.
Require: $s_y$ and $s_x$, pixel index in super resolution image s.
Require: n, number of samples of original image
for l = 0, ... , 1 do
   y = $s_y$ / e_h + (l− 1)
   for s = 0, ..., 1 do -continued ---
Algorithm 1.2 Four adjacent original pixel algorithm.
---

```
    x = s_x / e_h + (s- 1)
    o_i_[l * 2 + s] = y * n + x
  end for s
end for l
```

---
Algorithm 1.3 Original pixel algorithm.
---

This procedure determines the original image pixel (m_d_i), which has the minimum pixel value difference from the super resolution pixel. The m_d_i is one in o_i from algorithm 1.1 or 1.2.
Require: o, an m × n original image.
Require: m, number lines of original image.
Require n, number of samples of original image.
Require: e_h, enhance level, which is 2 for 2X super resolution, and 4 for 4X super resolution.
Require: s, an (e_h * m) × (e_h * n) super resolution image.
Require: o_i, adjacent original pixel index array from algorithm 1.1 or 1.2.
Require: s_y and s_x, pixel index in super resolution image s.
Require: n_b, number of bands
Require: n_v_a_p, number of adjacent original pixels, 9 or 4.
m_d = 999999.9  ← initialize minimum pixel value difference
for i = 0, ... , n_v_a_p − 1 do
   d_s = 0.0   ← initialize pixel value difference
   for b = 0, ..., n_b − 1 do
        or_i = o_i[i] + b * n * m ← pixel index in original image
        sr_i = s_y * n * e_h + s_x + b * e_h * n * e_h * m ← pixel index in SR image
        d = o_[or_i] − s_[sr_i]
        if ( d >= 0 )
          d_s += d
        else
          d_s −= d
   end for b
   if ( d_s < m_d )
      m_d = d_s
      m_d_i = i
end for i Table 1 below shows an example of a super resolution pixel "super", its corresponding original pixel "original", and its output after executing the maintaining original color algorithms 1.1, 1.2, and 1.3 (collectively referred to maintaining original color "MOC"). The number of bands is 8. The number of bits is 11 and pixel values are from 0 to 2047. The original pixel color components are in column "o com". The super resolution pixel color components are in column "s com". The color components of the output super resolution pixel are in "MOC com" column. After executing a combinatory search of 21 discrete values, the optimal solution is in the "optimal" column. The total pixel value difference between "super" and "MOC" is 141. The total pixel value difference between "super" and "optimal" is 140. This indicates that the "MOC" solution is very close to the optimal solution. The optimal solution needs 37,822,859, 361 (21*21*21*21*21*21*21) iterations, while the "MOC" needs only 6561 (3*3*3*3*3*3*3*3) iterations when using the output from algorithm 2.1 and 2.2 as input. The optimal solution is not practical with current computer hardware. The MOC solution can be executed in real-time. Based a super resolution image of 322961408 pixels, 8 bands, 11 bits, the quality metrics PSNR have improved from approximately 33.4067 to 35.4385 and SSIM quality metrics have improved from approximately 33.4067 to 0.956724. The higher the PSNR and SSIM, the more accurate the super resolution image.

TABLE 1

| original | super | MOC | optimal | o com | s com | MOC com | op com |
|---|---|---|---|---|---|---|---|
| 243 | 237 | 250 | 253 | .08435 | .07882 | .08344 | .08380 |
| 331 | 323 | 342 | 345 | .11489 | .10742 | .11415 | .11428 |
| 339 | 337 | 351 | 354 | .11767 | .11207 | .11716 | .11726 |
| 177 | 171 | 182 | 183 | .06144 | .05687 | .06075 | .06062 |
| 129 | 124 | 132 | 133 | .04476 | .04124 | .04406 | .04405 |
| 327 | 341 | 341 | 341 | .11350 | .11340 | .11382 | .11295 |
| 811 | 901 | 849 | 856 | .28150 | .29963 | .28338 | .28354 |
| 524 | 573 | 549 | 554 | .18188 | .19056 | .18324 | .18350 |
|  |  | 141 | 140 |  |  |  |  |

Maintaining Original Color Algorithm

A procedure that performs the computations to maintain the original color for a super resolution image pixel will now be discussed. For each super resolution pixel, this procedure runs algorithm 2.1, 2.2, and 2.3 sequentially. The output from 2.1 is the input to algorithm 2.2. The output from algorithm 2.2 is the input to algorithm 2.3.

---

Algorithm 2.1 Color maintain algorithm.

---

Given the original pixel and super resolution pixel, this procedure modifies the super resolution pixel such that the super resolution pixel has similar or the same color as the original pixel with minimum changes to the super resolution pixel values.
Require: c_m_s_p, color maintained super resolution pixel.
Require: o_p, original pixel.
Require: s_p, super resolution pixel.
Require: n_i, number of iterations, with a default value of 40.
Require: $\Delta$, delta component with a default value of 0.001 or 0.1%.
   s_o_p = 0 ← sum of original pixel values of all bands
   for i = 0, ... , n_b − 1 do
                s_o_p += o_p$_{[i]}$
                c_m_s_p$_{[i]}$ = s_p$_{[i]}$
   end for i
   c$_{[n\_b]}$ ← color components of original pixel
   c2$_{[n\_b]}$ ← modified color components of original pixel
   for i = 0, ... , n_b − 1 do
                c$_{[i]}$ = o_p$_{[i]}$ / s_o_p
   end for
   for i = 0, ... , n_i − 1 do
     s_c_m_s_p = 0 ← sum of color maintained super resolution pixel values of all bands
     for b = 0, ... , n_b − 1 do
       s_c_m_s_p += c_m_s_p$_{[b]}$
     end for b
     d = 0    ← initialize pixel value difference
       for b = 0, ... , n_b − 1 do
          d_m = |c$_{[b]}$ * s_c_m_s_p − s_p$_{[b]}$|   ←| | is the absolute value
          d_l = |(c$_{[b]}$ − $\Delta$) * s_c_m_s_p − s_p$_{[b]}$|   ←| | is the absolute value
          d_r = |(c$_{[b]}$ + $\Delta$) * s_c_m_s_p − s_p$_{[b]}$|   ←| | is the absolute value
         if(d_m <= d_l & d_m <= d_r)
            d += d_m
            c2$_{[b]}$ = c$_{[b]}$
         else if ( d_l <= d_m & d_l <= d_r)
            d += d_l
            c2$_{[b]}$ = c$_{[b]}$ − $\Delta$
         else
         d += d_r
         c2$_{[b]}$ = c$_{[b]}$ + $\Delta$
     end for b
     if( d < m_d)
       m_d = d
       for j = 0, ... , n_b − 1 do
          c_m_s_p$_{[j]}$ = c2$_{[j]}$ * s_c_m_s_p
       end for j
  end for i

---

Algorithm 2.2 Discrete value search algorithm.

---

Given the original pixel, super resolution pixel, and the color maintained super resolution pixel from algorithm 2.1, this procedure reduces the difference between color maintained super resolution pixel and the super resolution pixel. Pixel values are discrete integers and there are a finite number of possible values. For 1 byte or 8-bit image, the valid pixel values are from 0 to 255 for example. For 11 bit images, the valid pixel values are from 0 to 2047. To reduce the search range, the output from algorithm 2.1 are used as the initial values, which are already very close to its optimal values in most cases.
Require: c_m_s_p, color maintained super resolution pixel from algorithm 2.1.
Require: o_p, original pixel.
Require: s_p, super resolution pixel.
Require: c, original color component from algorithm 2.1
Require: $\Delta$, delta component with default value of 0.01 or 1%.
Require: s_r, search range with a default value 8 for 1 byte images and 16 for 2 byte images
s_v[n_b]   ← start search values
e_v[n_b]   ← end search values
v[n_b]   ← search values
for i = 0, ... , n_b − 1 do
   s_v$_{[i]}$ = c_m_s_p$_{[i]}$ − s_r   ← if < 0, set to 0
   e_v$_{[i]}$ = c_m_s_p$_{[i]}$ + s_r   ← if > maximum value, set to maximum value
end for i
for i = 0, ... , n_b − 1 do
   for b = 0, ... , n_b − 1 do
      for v$_{[b]}$ = s_v$_{[b]}$, ... , e_v$_{[b]}$ do
         s_c_m_s_p = v$_{[b]}$
         for b2 = 0, ... , n_b − 1 do -continued

---

Algorithm 2.2 Discrete value search algorithm.

---

```
            if ( b != b2 )
                s_c_m_s_p += c_m_s_p[b2]
        end for b2
    d = 0   ← initialize pixel value difference
    c2[n_b]  ← modified color components of original pixel
    for b2 = 0, ... , n_b − 1 do
            d_m = |c[b] * s_c_m_s_p − s_p[b]|   ←| | is the absolute value
            d_l = |(c[b] − Δ) * s_c_m_s_p − s_p[b]|  ←| | is the absolute value
            d_r = |(c[b] + Δ) * s_c_m_s_p − s_p[b]|  ←| | is the absolute value
            if ( d_m <= d_l & d_m <= d_r)
                d += d_m
                c2[b] = c[b]
            else if ( d_l <= d_m & d_l <= d_r)
                d += d_l
                c2[b] = c[b] − Δ
            else
                d += d_r
                c2[b] = c[b] + Δ
        end for b2
        if( d < m_d)
            m_d = d
            for j = 0, ... , n_b − 1 do
                c_m_s_p[j] = c2[j] * s_c_m_s_p
            end for j
    end for v[b]
  end for b
end for i
```

---

---

Algorithm 2.3 Discrete value band-wise combinatory search algorithm.

---

A procedure that performances a combinatory search of all bands with a very small
search range. There are five algorithms for 3 bands, 4 bands, 6 and 8 bands, and
more than 8 bands images respectively. The following is for 4 bands images.
Require: c_m_s_p, color maintained super resolution pixel from algorithm 2.1
Require: s_p, super resolution pixel.
Require: c, original color component from algorithm 2.1.
Require: m_d, minimum difference from algorithm 2.1.
Require: Δ, delta component with default value of 0.01 or 1%.
Require: s_r, search range. Default value is 9 − number of bands. For 8 bands, it is
1. For 4 bands, it is 5. For 3 bands, it is 6.

```
s_v[4]                           ← start search values
e_v[4]                           ← end search values
v[4]                             ← search values
for i = 0, ... , 3 do
    s_v[i] = c_m_s_p[i] − s_r       ← if < 0, set to 0
    e_v[i] = c_m_s_p[i] + s_r       ← if > maximum value, set to maximum value
end for i
c2[4]                            ← modified color components of original pixel
for v[0] = s_v[0], ..., e_v[0] do
    for v[1] = s_v[1], ..., e_v[1] do
        for v[2] = s_v[2], ..., e_v[2] do
            for v[3] = s_v[3], ..., e_v[3] do
                s_c_m_s_p = v[0] + v[1] + v[2] + v[3]
                d = 0        ← initialize pixel value difference
                for b = 0, ... , 3 do
                    d_m = |c[b] * s_c_m_s_p − s_p[b]|
                    d_l = |(c[b] − Δ) * s_c_m_s_p − s_p[b]|
                    d_r = |(c[b] + Δ) * s_c_m_s_p − s_p[b]|
                    if ( d_m <= d_l & d_m <= d_r)
                        d += d_m
                        c2[b] = c[b]
                    else if ( d_l <= d_m & d_l <= d_r)
                        d += d_l
                        c2[b] = c[b] − Δ
                    else
                        d += d_r
                        c2[b] = c[b] + Δ
                end for b
                if ( d < m_d )
                    m_d = d
                    for j = 0, ... , n_b − 1 do
                        c_m_s_p[j] = c2[j] * s_c_m_s_p
```

-continued

---

Algorithm 2.3 Discrete value band-wise combinatory search algorithm.

```
                              end for j
        end for v[3]
      end for s_v[2]
    end for v[1]
end for v[0]
```

---

When the super resolution model has a crop size or tile size of 512×512 pixels, the valid output tile size is reduced from 512 to 492 in order to get rid of border effects. The number of border pixels is determined by experiments and can be adjusted based on a parameter in a strategy file. A strategy file has a number of parameters that are used to run all algorithms for super resolution image generation including model training. Border effects are caused by the super resolution model. In the border area of a tile, the accuracy of super resolution pixels is not as high as the accuracy of the middle area. As a result, there are visible seam lines between adjacent tiles. The remove tile border effects algorithm set (below) outputs only the middle area of a tile and the output SR image does not have visible seam lines between adjacent tiles.

their resolutions. The presently disclosed methods of maintaining original color significantly improves quality metrics of super resolution images.

Figure 4:
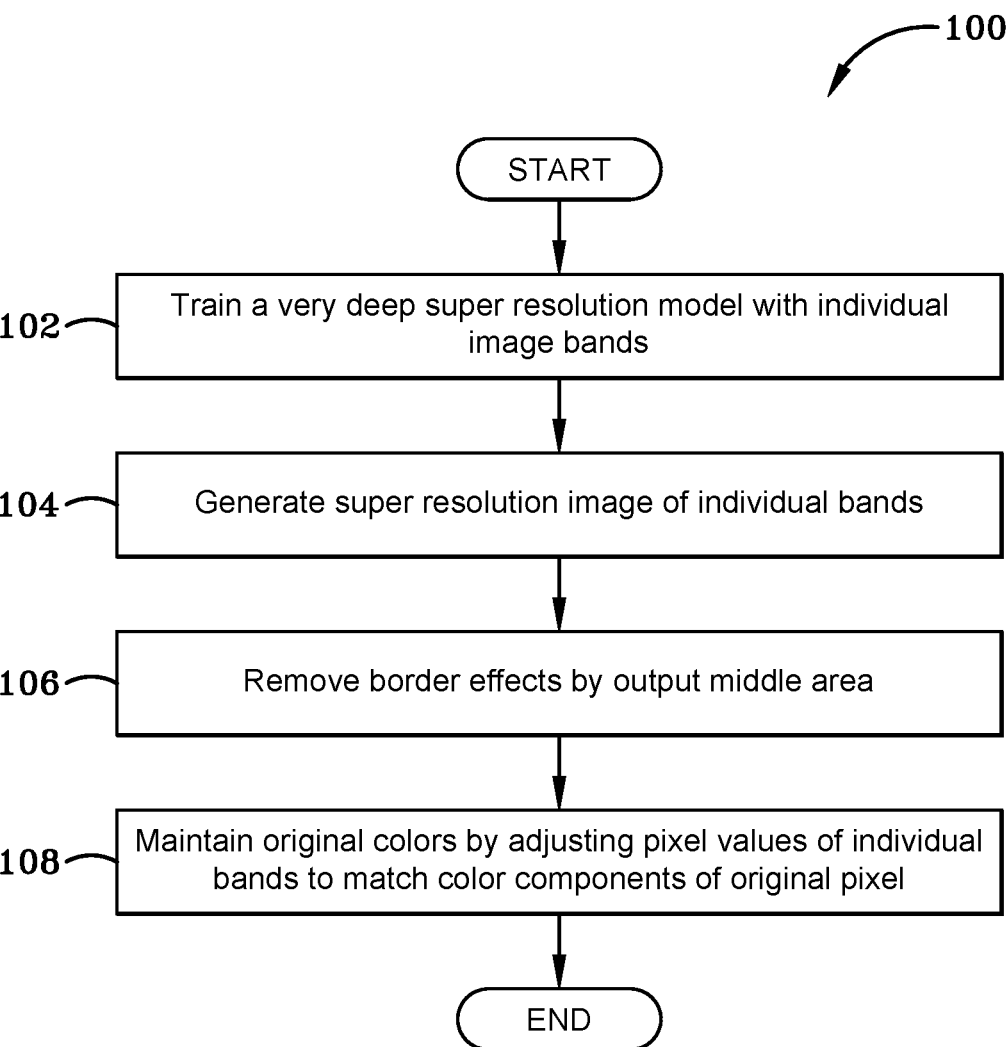
FIG. 4 (FIG. 4) is a flowchart showing a process for generating super resolution multispectral and hyperspectral geospatial images while maintaining original color and removing border effects of an image, according to one aspect of the present disclosure.

With reference to FIG. 4, a process for training a CNN and applying super resolution algorithms to one or more geospatial images is shown and generally indicated as process 100. In a first component, at reference 102, a very deep super resolution model (such as DCNN 24) may be trained with individual image bands. This may involve a plurality of geospatial images with any number of bands being input into the database of CPU 20 in order to produce a plurality of training image chips. The plurality of training image chips may be of a single band from the images and be 512×512 in size. The plurality of training image chips are then utilized to train the very deep super resolution network DCNN 24.

---

REMOVE TILE BORDER EFFECTS ALGORITHM

A procedure that removes tile border effects in a super resolution image will now be discussed. An original image may be partitioned into tiles with a crop size of the super resolution model being 512 × 512. With a number of border pixels of 10, the output tile size is 512 − 10 * 2= 492.

Require: o, an m × n original image.
Require: m, number lines or rows of an original image.
Require n, number of samples or columns of an original image.
Require: e_h, enhance level, which is 2 for 2X super resolution, and 4 for 4X super resolution.
Require: t_s, tile size or crop size, which is 512.
Require: n_b_p, number of border pixels, which has default value of 10 pixels.
Require: n_b, number of bands.

```
    o_t_s = t_s / e_h                    ← original image tile size
    s_t_s = t_s                          ← super resolution image tile size
    o_o_t_s = o_t_s − n_b_p                ← output original image tile size
    o_s_t_s = s_t_s − e_h * n_b_p          ← output SR image tile size
    n_x_t = n / o_o_t_s                   ← number of column tiles
    if ( n % o_o_t_s > 0 )                ← % is integer remainder operation
        n_x_t += 1
    n_y_t = m / o_o_t_s                   ← number of row tiles
    if ( m % o_o_t_s > 0 )
        n_y_t += 1
for y_t = 0, ..., n_y_t − 1 do
        for x_t = 0, ..., n_x_t − 1 do
            for b = 0, ..., n_b − 1 do
            load a tile of original image of tile size o_t_s with center
            determined by o_o_t_s
            up-sample by e_h to s_t_s
            apply super resolution model
            write a tile of o_s_t_s into SR image, which is the middle 492 ×
            492 out of 512 × 512
            end for b
        end for x_t
end for y_t
```

---

As indicated previously herein, the presently disclosed method is capable of generating super resolution images of any number of bands. In multispectral and hyperspectral satellite images, the number of bands is typically 3 to 10 bands for multispectral and a few hundred narrow bands for hyperspectral. These satellite images have large GSD and particularly need super resolution technology to increase The de-noise algorithm presented herein may be utilized by both CPU 20 and GPU 22, but most of the heavy processing will tend to be done by GPU 22.

The output from the first component 102 is a trained super resolution model (in deep learning, the term "model" is used to indicate that the DCNN 24 network has been instantiated or is ready to be deployed). In a second component 104, which again tends to occur partially in CPU 20 and partially in GPU 22, the system will generate super resolution image tiles (512×512 pixels) band sequential using the model from the first component 102, again utilizing original pixel algorithms 1.1-1.3. The output from the second component 104 is the input to the third component 106, which outputs only the middle 492×492 pixels of the image tiles to remove border effects. Once the model is fully trained, the input into the second component 104 may be an image, or images, of interest having a lower resolution. These images may be fed into the DCNN and used to generate the super resolution image tiles to enhance the resolution (super resolution) of the lower resolution image(s), as discussed herein.

The accuracy of super resolution pixels is higher in the middle of the tile than at the edges. For pixels close to the borders of a tile, the accuracy decreases which may result in seam lines between adjacent tiles. By outputting only the pixels in the middle area, the remove tile border effects algorithm from the third component 106 generates seamless high accuracy super resolution images. The output from the third component 106 is the input to the forth component 108.

As discussed previously herein, maintaining original colors by adjusting super resolution pixel values of individual bands to match color components of original pixel can significantly improve super resolution quality metrics: PSNR and SSIM. For each super-resolution pixel, the processes described herein find the most similar original pixel and use it to maintain the original color. This is because the super-resolution model may shift or translate original pixels to form the super-resolution image pixel. In other words, one of main functions of the super-resolution model is this translate/shift between original pixels and super-resolution pixels.

The third component 106 of process 100 includes selecting the number of border pixels. The number of border pixels has a default value of ten pixels. A different number of pixels may be used by changing the default value in a strategy file, containing the input parameters that are used in process 100. A larger value may improve accuracy, but at the cost of reduced processing speed.

With continued reference to FIG. 4, but with further reference to FIG. 3 In the fourth component 108, algorithms 1.1-1.3 and 2.1-2.3 may be utilized to maintain original colors by adjusting pixel values of individual bands to match color components of original pixel. The first two algorithms 1.1 and 1.2, may determine the nine or four adjacent original pixels for a super resolution pixel. The original pixel should be one of these adjacent pixels. Specifically, algorithm 1.1 may determine nine adjacent pixels for super resolution pixels a, b, c, and d with the same nine adjacent original pixels. Algorithm 1.2 may further determine four adjacent pixels. For super resolution pixel a, the adjacent pixels are pixels 1, 2, 4, and 5. For super resolution pixel b, the four adjacent pixels are 2, 3, 5, and 6. For super resolution pixel c, the four adjacent pixels are 4, 5, 7, and 8. For super resolution pixel d, the four adjacent pixels are 5, 6, 8, and 9.

Algorithm 1.3 selects the original pixel based on how similar the adjacent pixel is to the super resolution pixel by its values. Applying super resolution to individual bands can cause the color of the bands to change. This is not desirable because super resolution is to improve resolution, not to change colors. For example, a red car in the original image should appear as a red car in the super resolution image. To remedy this undesirable side effect, algorithms 2.1, 2.2, and 2.3 may then be applied to maintain the original color while minimizing changes to the super resolution pixel values.

With reference to Table 1, above, according to one example, a super resolution pixel of eight bands of eleven bits is used having the following pixel values (237, 323, 337, 171, 124, 341, 901, 573) listed as "super" in Table 1. The color components (s com) of the super resolution pixel are (0.07882, 0.10742, 0.11207, 0.05687, 0.04124, 0.11340, 0.29963, 0.19056).

The original pixel values ("original") are (243, 331, 339, 177, 129, 327, 811, 524) and the color components ("o com") of the original pixels are (0.08435, 0.11489, 0.11767, 0.06144, 0.04476, 0.11350, 0.28150, 0.18188). This is noticeably different from the color components "s com" of the super pixels.

Algorithms 2.1, 2.2, and 2.3 are then employed to modify the super resolution pixel values to (250, 342, 351, 182, 132, 341, 849, 549), shown as "MOC in Table 1. The modified super resolution pixels MOC have color components ("MOC com") of (0.08344, 0.11415, 0.11716, 0.06075, 0.04406, 0.11382, 0.28338, 0.18324), which is now very close or almost identical to the original color (o com) while the changes to the super resolution pixel values is only 141. To validate algorithms 2.1, 2.2, 2.3, a band-wise combinatorial exhaustive search yields the optimal super resolution pixel values ("optimal") as (253, 345, 354, 183, 133, 341, 856, 554). The optimal solution changes the super resolution pixel values by 140, which is only 1 smaller than the 141 from algorithm 2.1, 2.2, and 2.3. The exhaustive search needs 37,822,859,361 ($21^8$) iterations, while algorithm 2.3 needs only 6561 ($3^8$) iterations when using the output from algorithm 2.1 and 2.2 as input. The exhaustive search is not practical with current computer hardware, while algorithms 2.1, 2.2, and 2.3 operate with up to five million times faster processing speed. After applying algorithms 2.1, 2.2, and 2.3, the PSRN and SSIM metrics have improved from approximately 33.4067 and 0.948264 to approximately 35.4385 and 0.956724, respectively, for a super resolution image of 322,961,408 pixels.

It should be understood that while the above disclosure relates to geospatial images, the same principles applied herein may be utilized for other images where it is desirable to improve the resolution of existing images. Two such examples may include medical images and LIDAR point clouds.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks, or fiber optic networks.

The various methods or processes outlined herein may be coded as software/instructions that are executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" if used herein are used in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in a computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", if used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the preferred embodiment of the disclosure are an example and the disclosure is not limited to the exact details shown or described.

As described herein, aspects of the present disclosure may include one or more electrical, pneumatic, hydraulic, or other similar secondary components and/or systems therein. The present disclosure is therefore contemplated and will be understood to include any necessary operational components thereof. For example, electrical components will be understood to include any suitable and necessary wiring, fuses, or the like for normal operation thereof. Similarly, any pneumatic systems provided may include any secondary or peripheral components such as air hoses, compressors, valves, meters, or the like. It will be further understood that any connections between various components not explicitly described herein may be made through any suitable means including mechanical fasteners, or more permanent attachment means, such as welding or the like. Alternatively, where feasible and/or desirable, various components of the present disclosure may be integrally formed as a single unit.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

As used herein in the specification and in the claims, the term "effecting" or a phrase or claim element beginning with the term "effecting" should be understood to mean to cause something to happen or to bring something about. For example, effecting an event to occur may be caused by actions of a first party even though a second party actually performed the event or had the event occur to the second party. Stated otherwise, effecting refers to one party giving another party the tools, objects, or resources to cause an event to occur. Thus, in this example a claim element of "effecting an event to occur" would mean that a first party is giving a second party the tools or resources needed for the second party to perform the event, however the affirmative single action is the responsibility of the first party to provide the tools or resources to cause said event to occur.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding,"

"composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A computer program product including at least one non-transitory computer readable storage medium in operative communication with a processor and a framework comprising an active data storage and an execution protocol, wherein the execution protocol is coupled with the active data storage, the storage medium having instructions stored thereon that, when executed by the processor, implement a method of generating a super resolution geospatial image from a lower resolution image comprising:

generate a super resolution individual image tile from the low resolution image utilizing a trained super resolution model;

select a plurality of pixels from the low resolution image that are adjacent to a plurality of super resolution pixels deduced from the super resolution model;

identify an original pixel from the lower resolution image having a minimum pixel value difference from each super resolution pixel;

maintain an original color of the at least one lower resolution image in the super resolution image tile by selecting a reduced output area from the image tile;

remove any border effects introduced by utilizing the reduced output area selection; and generate a super resolution geospatial image having a higher resolution than the low resolution image;

wherein the reduced output area of the super resolution individual image tile is the middle 492×492 pixels of the super resolution individual image tile.

2. The computer program product of claim 1 wherein the plurality of pixels from the low resolution image further comprise one of:

a group of nine pixels adjacent to the plurality of super resolution pixels deduced from the low resolution image, or a group of four pixels adjacent to each individual super resolution pixel deduced from the low resolution image.

3. The computer program product of claim 1 wherein the super resolution individual image tile has a crop size of 512×512 pixels.

4. The computer program product of claim 1 wherein the instructions further comprise:

find a corresponding original pixel for each super resolution pixel to improve at least one quality metric of the super resolution geospatial image.

5. The computer program product of claim 4 wherein the at least one quality metric further comprises:

at least one of a peak signal-to-noise ratio (PSNR) or a structural similarity index measure (SSIM).

6. The computer program product of claim 1 wherein maintaining original color of the lower resolution image further comprises:

modify each super resolution pixel value to match color components of an original pixel corresponding to the super resolution pixel.

7. The computer program product of claim 6 wherein modifying each super resolution pixel to match the color components of the original pixel further comprises:

compute color components by the ratios between individual band pixel value and a sum of all band pixel values.

8. The computer program product of claim 7 wherein instructions further comprise:

sequentially search a range of discrete values centered at each super resolution pixel to find minimum differences between super resolution pixel values and modified super resolution pixel values.

9. A system comprising:

at least one of a camera and a sensor operable to capture a geospatial image of a surface;

at least one processor capable of executing logical functions in communication with a vehicle and the at least one of the camera and the sensor; and at least one non-transitory computer readable storage medium having instructions encoded thereon that, when executed by the processor, implements operations to enhance the resolution of the geospatial image, the instructions including:

receive the geospatial image as a low resolution image;

input the low resolution image into a previously trained super resolution model;

generate a super resolution individual image tile from the low resolution image utilizing the trained super resolution model;

select a plurality of pixels from the low resolution image that are adjacent to a plurality of super resolution pixels deduced from the super resolution model;

identify an original pixel from the lower resolution image having a minimum pixel value difference from each super resolution pixel;

maintain an original color of the at least one lower resolution image in the super resolution image tile by selecting a reduced output area from the image tile;

remove any border effects introduced by utilizing the reduced output area selection; and generate a super resolution geospatial image having a higher resolution than the low resolution image;

wherein the super resolution individual image tile has a crop size of 512×512 pixels and the reduced output area of the super resolution individual image tile is the middle 492×492 pixels of the super resolution individual image tile.

10. The system of claim 9 wherein the plurality of pixels from the low resolution image further comprise one of:

a group of nine pixels adjacent to the plurality of super resolution pixels deduced from the low resolution image, or a group of four pixels adjacent to each individual super resolution pixel deduced from the low resolution image.

11. The system of claim 9 wherein the instructions further comprise:

find a corresponding original pixel for each super resolution pixel to improve at least one of peak signal-to-noise ratio (PSNR) and structural similarity index measure (SSIM) of the super resolution geospatial image.

12. The system of claim 9 wherein the instructions further comprise:

modify each super resolution pixel value to match color components of an original pixel corresponding to the super resolution pixel by computing color components by the ratios between individual band pixel value and a sum of all band pixel values to maintain the original color of the lower resolution image.

13. The system of claim 12 wherein the instructions further comprise:

find minimum differences between super resolution pixel values and modified super resolution pixel values by sequentially searching a range of discrete values centered at each super resolution pixel.

* * * * *